US009263893B2

(12) United States Patent
Haga et al.

(10) Patent No.: US 9,263,893 B2
(45) Date of Patent: Feb. 16, 2016

(54) ELECTRICITY STORAGE DEVICE, ELECTRICITY STORAGE CONTROL METHOD, MANAGEMENT DEVICE, MANAGEMENT METHOD, AND ELECTRICITY STORAGE SYSTEM

(75) Inventors: Tomoyuki Haga, Nara (JP); Yoshito Nakanishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 447 days.

(21) Appl. No.: 13/809,415

(22) PCT Filed: Feb. 1, 2012

(86) PCT No.: PCT/JP2012/000670
§ 371 (c)(1),
(2), (4) Date: Jan. 10, 2013

(87) PCT Pub. No.: WO2012/114657
PCT Pub. Date: Aug. 30, 2012

(65) Prior Publication Data
US 2013/0113434 A1    May 9, 2013

(30) Foreign Application Priority Data

Feb. 25, 2011  (JP) ................................ 2011-039747

(51) Int. Cl.
*H02J 3/32* (2006.01)
*H02J 3/14* (2006.01)
*H02J 7/35* (2006.01)

(52) U.S. Cl.
CPC ... *H02J 3/32* (2013.01); *H02J 3/14* (2013.01); *H02J 7/35* (2013.01); *H02J 2003/143* (2013.01);
(Continued)

(58) Field of Classification Search
CPC .................................................. Y02B 70/3225
USPC ........................................................ 320/134
See application file for complete search history.

(56) References Cited

U.S. PATENT DOCUMENTS 7,960,944 B2   6/2011  Hoffman et al.
8,116,998 B2 *  2/2012  Hess ............................... 702/63
(Continued)

FOREIGN PATENT DOCUMENTS

CN    101796703    8/2010
CN    101902049    12/2010
(Continued)

OTHER PUBLICATIONS

STIC Search Report Mar. 30, 2015.*
(Continued)

*Primary Examiner* — Drew A Dunn
*Assistant Examiner* — Harry O'Neill-Becerril
(74) *Attorney, Agent, or Firm* — Wenderoth, Lind & Ponack L.L.P.

(57) ABSTRACT

An electricity storage control device that transmits a charging rate of at least one of electricity storage devices to a management device that manages electric power interchange between the electricity storage devices, the electricity storage control device including: a charge information acquisition unit that acquires the charging rate of the at least one electricity storage device as a first charging rate; a communication unit that transmits the first charging rate to the management device; and a control unit that causes the communication unit to transmit, instead of the first charging rate, a second charging rate that charge and discharge determining information defines as the charging rate at which the charge and discharge are prohibited, when the charge and discharge determining information defines the first charging rate as the charging rate at which the charge and discharge are permitted.

14 Claims, 13 Drawing Sheets

(52) U.S. Cl.
CPC ........ *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(56) References Cited

U.S. PATENT DOCUMENTS

| | | | |
|---|---|---|---|
| 8,315,755 B2* | 11/2012 | Hirata et al. | 701/22 |
| 8,493,030 B2 | 7/2013 | Paice et al. | |
| 8,963,501 B2 | 2/2015 | Shigemizu et al. | |
| 2007/0200433 A1* | 8/2007 | Kelty | 307/66 |
| 2010/0127664 A1 | 5/2010 | Paice et al. | |
| 2010/0264875 A1 | 10/2010 | Hoffman et al. | |
| 2010/0293398 A1 | 11/2010 | Diab | |
| 2011/0279085 A1 | 11/2011 | Shigemizu et al. | |
| 2012/0221491 A1* | 8/2012 | Koshin et al. | 705/412 |

FOREIGN PATENT DOCUMENTS

| | | |
|---|---|---|
| EP | 2 357 714 | 8/2011 |
| JP | 2006-174540 | 6/2006 |
| JP | 2006-288162 | 10/2006 |
| JP | 2010-141970 | 6/2010 |
| JP | 2010-220428 | 9/2010 |
| JP | 2011-135727 | 7/2011 |
| WO | 2009/032058 | 3/2009 |

OTHER PUBLICATIONS

STIC Search Report Nov. 4, 2015.*
European Patent Search Report issued Nov. 18, 2014 in corresponding to European patent application No. 12749582.8.
International Search Report issued Apr. 24, 2012 in International (PCT) Application No. PCT/JP2012/000670.
European Search Report issued Feb. 24, 2015 in corresponding European Patent Application No. 12749582.8.
An Office Action issued Apr. 3, 2015 in corresponding Chinese patent application No. 201280001970.2 (with English translation).
Chun-yang Zhao et al., "Charge management technology of spacecraft lithium-ion batteries", Chinese Journal of Power Sources, vol. 32, No. 10, Oct. 31, 2008, pp. 663-665 (with English abstract).

* cited by examiner (a)

(b)

ELECTRICITY STORAGE DEVICE, ELECTRICITY STORAGE CONTROL METHOD, MANAGEMENT DEVICE, MANAGEMENT METHOD, AND ELECTRICITY STORAGE SYSTEM

TECHNICAL FIELD

The present invention relates to an electricity storage control device or the like which transmits charging rates of electricity storage devices to a management device that manages electric power interchange between the electricity storage devices.

BACKGROUND ART

In recent years, together with an electricity generation device such a photovoltaic generation device, an electricity storage device has been increasingly placed for each consumer. The electricity storage device charges when an amount of consumed electricity is smaller than an amount of generated electricity, and discharges when the amount of consumed electricity is larger than the amount of generated electricity, thereby enabling the consumer to efficiently use electricity generated by the electricity generation device.

It is assumed that a storage battery such as a lithium-ion battery is used as such an electricity storage device. The storage battery such as the lithium-ion battery has characteristics of deteriorating when charging or discharging excessively. Thus, for instance, the charge or discharge of the storage battery is managed so that a charging rate fails within a certain range (e.g., 20% to 80%).

In view of the above, to keep the charging rate of the storage battery in the certain range, a technique of performing electric power interchange between consumers has been proposed (e.g., refer to Patent Literature (PTL) 1). In the technique disclosed in PTL 1, the electric power interchange is performed according to an amount of electricity stored in the storage battery.

CITATION LIST

Patent Literature

[PTL 1]
Japanese Unexamined Patent Application Publication No. 2006-288162

SUMMARY OF INVENTION

Technical Problem

However, when the electric power interchange is performed according to the amount of electricity stored in the storage battery as in the technique disclosed in PTL1, unnecessary electric power interchange may be performed.

Specifically, in the case where it is assumed, for example, that a first consumer hardly consumes electricity (e.g., the first consumer stays away from home due to travelling or the like), when an amount of electricity charged in a storage battery of the first consumer is small, electric power interchange from a storage battery of a second consumer to the storage battery of the first consumer is performed. However, subsequently, electricity generated by the first consumer is stored into the storage battery of the first consumer, and thus the amount of electricity stored in the storage battery of the first consumer becomes excessive. As a result, electric power interchange from the storage battery of the first consumer to a storage battery of a third consumer is further performed. In other words, the electric power interchange is performed beyond necessity, thereby increasing the number of times the storage battery charges or discharges.

The present invention has been conceived to solve the problem, and an object of the present invention is to provide an electricity storage control device, a management device, and an electricity storage control system that reduce occurrence of unnecessary electric power interchange when electric power interchange is performed between electricity storage devices.

Solution to Problem

In order to achieve the object, an electricity storage control device according to one aspect of the present invention is an electricity storage control device that transmits a charging rate of at least one of electricity storage devices to a management device that manages electric power interchange between the electricity storage devices, wherein the management device refers to charge and discharge determining information defining a charging rate at which charge and discharge for electric power interchange are permitted and a charging rate at which the charge and discharge are prohibited, and allows electric power interchange between electricity storage devices having the charging rate at which the charge and discharge are permitted, the electricity storage control device including: a charge information acquisition unit configured to acquire the charging rate of the at least one electricity storage device as a first charging rate; a communication unit configured to transmit the first charging rate to the management device; and a control unit configured to cause the communication unit to transmit, instead of the first charging rate, a second charging rate that the charge and discharge determining information defines as the charging rate at which the charge and discharge are prohibited, when (a) the electricity storage control device is operating in an operation mode that prohibits at least one of the charge for electric power interchange and the discharge for electric power interchange and (b) the charge and discharge determining information defines the first charging rate as the charging rate at which the charge and discharge are permitted.

With this configuration, when the electricity storage control device is operating in the operation mode that prohibits the at least one of the charge for electric power interchange and the discharge for electric power interchange, it is possible to transmit, to the management device, the second charging rate instead of the first charging rate obtained from the electricity storage device, the second charging rate being defined as the charging rate at which the charge and discharge are prohibited. In other words, when it is necessary to prohibit the charge or discharge for electric power interchange, it is possible to prevent the charge or discharge for electric power interchange from being instructed. In short, it is possible to reflect an electricity consumption plan of each consumer in the charge and discharge instruction for electric power interchange. Consequently, it is possible to reduce occurrence of unnecessary electric power interchange.

Moreover, with the configuration, it is necessary to share the prohibition of the charge or discharge for electric power interchange with the management device. Stated differently, it is possible to prevent the charge or discharge for the electric power interchange using the charging rate to be transmitted to the management device, without notifying the management device of the electricity consumption plan of the consumer or the like. Thus, it is possible to protect privacy information of the consumer such as a plan for long-term absence from home.

Moreover, the control unit may cause the communication unit to transmit the second charging rate instead of the first charging rate when (a) the electricity storage control device is operating in an operation mode that prohibits the charge for electric power interchange, (b) the charge and discharge determining information defines the first charging rate as the charging rate at which the charge and discharge are permitted, and (c) the first charging rate is less than a predetermined threshold value.

With this configuration, it is possible to transmit the second charging rate instead of the first charging rate when the first charging rate is less than the predetermined threshold value. To put it another way, when the first charging rate is higher than or equal to the predetermined threshold value, it is possible to directly transmit the first charging rate even when the first charging rate is the charging rate at which the charge and discharge are permitted. Consequently, it is possible to discharge for other electricity storage devices when the charging rate is high, thereby allowing the electric power interchange to be performed efficiently.

Moreover, the charge and discharge determining information may define a first charge and discharge permitted range, a charge and discharge prohibited range, and a second charge and discharge permitted range, the first charge and discharge permitted range may be a range of the charging rate at which the charge and discharge for electric power interchange are permitted, and is a range less than a first threshold value, the charge and discharge prohibited range may be a range of the charging rate at which the charge and discharge for electric power interchange are prohibited, and is a range greater than or equal to the first threshold value and less than a second threshold value, and the second charge and discharge permitted range may be a range of the charging rate at which the charge and discharge for electric power interchange are permitted, and is a range greater than or equal to the second threshold value.

With this configuration, it is possible to set a range between the first and second charge and discharge permitted range as a charge and discharge prohibited range. In other words, it is possible to set a range of a charging rate at which the electricity storage device deteriorates as the charge and discharge permitted range, thereby reducing the deterioration of the electricity storage device.

Moreover, the control unit may be further configured to calculate the second charging rate so that a temporal variation of a charging rate to be transmitted to the management device approximates a temporal variation of a charging rate of the at least one electricity storage device that is already acquired.

With this configuration, it is possible to reduce a possibility of an operation mode being determined based on the temporal variation of the charging rate. In short, it is possible to further protect the privacy information of the consumer.

Moreover, the electricity storage control device may further include a mode notification unit configured to notify a user that the electricity storage control device is operating in the operation mode.

With this configuration, it is possible to notify the user that the electricity storage control device is operating in the operation mode that prohibits the charge for electric power interchange.

Moreover, the control unit may be further configured to cause the communication unit to transmit a third charging rate instead of the first and second charging rates so that a charging rate to be transmitted to the management device varies smoothly when the electricity storage control device starts operating in the operation mode.

With this configuration, when the electricity storage control device starts operating in the operation mode that prohibits the charge for electric power interchange, it is possible to smoothly vary the charging rate to be transmitted to the management device. Thus, this prevents the charging rate to be transmitted to the management device from intermittently varying, thereby reinforcing the protection of the privacy information of the consumer.

Moreover, the electricity storage control device may be configured as an integrated circuit.

A management device according to another aspect of the present invention is a management device that manages electric power interchange between electricity storage devices, the management device including: a communication unit configured to receive a charging rate of each of the electricity storage devices; a selection unit configured to select, by referring to charge and discharge determining information defining a charging rate at which charge and discharge for electric power interchange are permitted and a charging rate at which the charge and discharge are prohibited, electricity storage devices having the charging rate at which the charge and discharge are permitted, from among the electricity storage devices; and a management unit configured to cause the communication unit to transmit charge and discharge instructing information for causing, between the selected electricity storage devices, electric power interchange from an electricity storage device having a high charging rate to an electricity storage device having a low charging rate.

With this configuration, it is possible to manage the electric power interchange using the charging rate at which the charge and discharge for electric power interchange are prohibited. Thus, it is possible to reduce the occurrence of the unnecessary electric power interchange.

The management device may further include an update unit configured to update the charge and discharge determining information depending on the number of the electricity storage devices having the charging rate at which the charge and discharge are permitted, wherein the communication unit may be configured to transmit the updated charge and discharge determining information to the electricity storage control device.

With this configuration, it is possible to update the charge and discharge determining information according to the number of the electricity storage devices having the charging rate at which the charge and discharge for electric power interchange are permitted. Thus, for instance, when the number of the electricity storage devices that can charge or discharge is reduced, it is possible to decrease the charge prohibited range, thereby ensuring the electric power interchange.

Moreover, the update unit may be configured to update the charge and discharge determining information so that a defined range of the charging rate at which the charge and discharge are permitted increases, when the number of the electricity storage devices having the charging rate at which the charge and discharge are permitted is less than a threshold value.

With this configuration, when the number of the electricity storage devices having the charging rate at which the charge and discharge for electric power interchange are permitted is reduced, it is possible to increase the charge permitted range defined in the charge and discharge determining information. Thus, it is possible to increase the number of the electricity storage devices that can charge or discharge, and ensure the electric power interchange.

Moreover, an electricity storage control system according to still another aspect of the present invention includes the electricity storage control device and the management device.

With this configuration. It is possible to produce the same advantageous effects as those of the electricity storage control device and the management device.

It is to be noted that the present invention is realized not only as such an electricity storage control device or a management device but also as an electricity storage control method or a management method having, as steps, operations of the characteristics constituent elements included in the electricity storage control device or the management device. Moreover, the present invention can be implemented as a computer program for causing a computer to execute the respective characteristic steps included in the electricity storage control method or the management method, in addition, it goes without saying that such a computer program can be distributed via a non-transitory recording medium such as a CD-ROM (Compact Disc Read Only Memory) or a transmission medium such as the Internet.

Advantageous Effects of Invention

The present invention makes it possible to reduce occurrence of unnecessary electric power interchange when electric power interchange is performed between electricity storage devices.

DESCRIPTION OF EMBODIMENTS

The following describes embodiments of the present invention with reference to the drawings.

Embodiment 1

Figure 1:
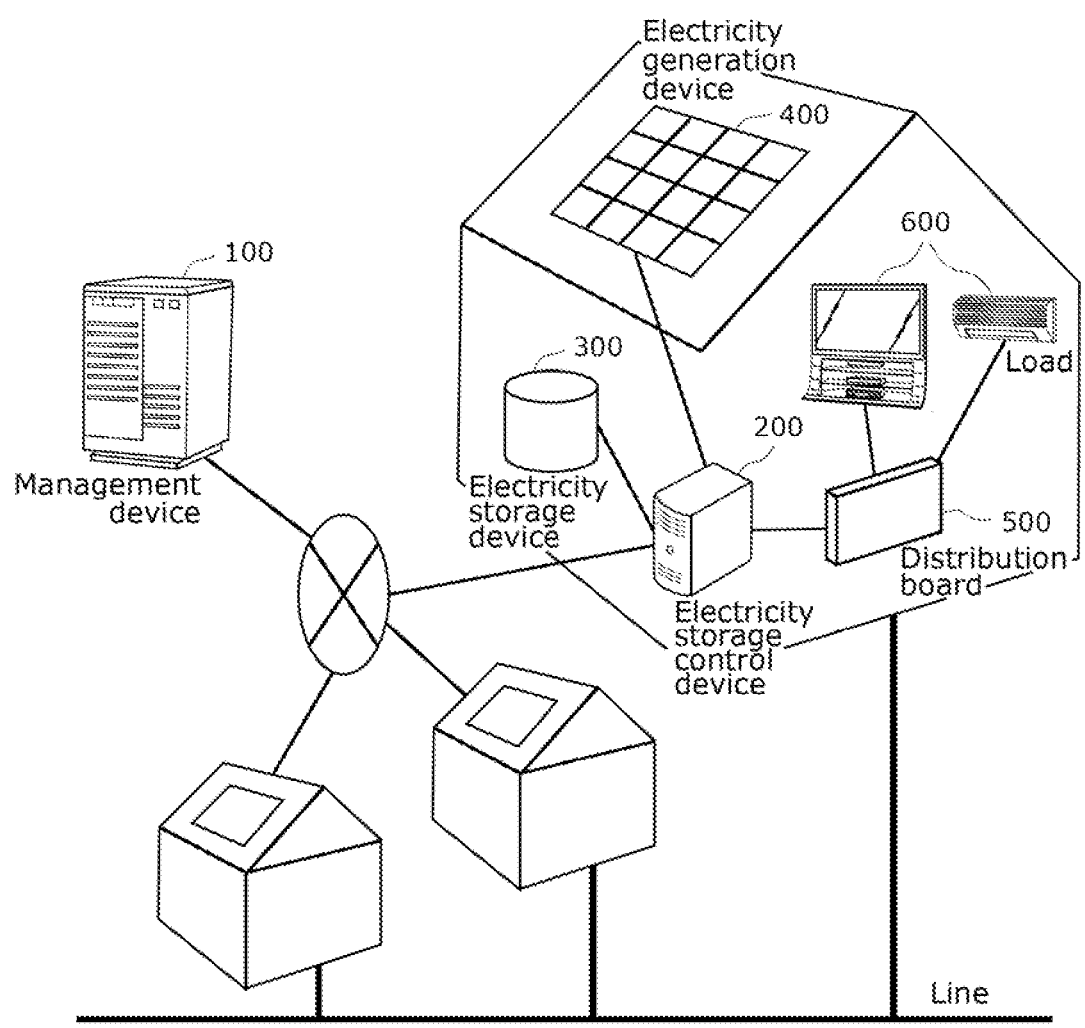
FIG. 1 is a diagram for illustrating a usage example of an electricity storage control system according to Embodiment 1 of the present invention.

FIG. 1 is a diagram for illustrating a usage example of an electricity storage control system according to Embodiment 1 of the present invention. An electricity storage control system 10 includes a management device 100, electricity storage control devices 200, and electricity storage devices 300.

The management device 100 manages electric power interchange between the electricity storage devices 300 according to charge and discharge determining information 210. Here, a charging rate at which charge and discharge for electric power interchange are permitted and a charging rate at which the same is prohibited are defined in the charge and discharge determining information 210. Thus, the management device 100 has, by referring to the charge and discharge determining information 210, the electric power interchange performed between electricity storage devices each having a charging rate at which the charge and discharge for electric power interchange are permitted.

It is to be noted that the electric power interchange means supplying electricity stored in one electricity storage device 300 to another electricity storage device 300. To put it another way, the electric power interchange is performed by causing the electricity storage device 300 to discharge and the other electricity storage device 300 to charge.

Each of the electricity storage control devices 200 is placed for a corresponding one of consumers, and transmits a charging rate of a corresponding one electricity storage device 300 to the management device 100. The electricity storage control device 200 is connected to at least one of the electricity storage devices 300.

Each of the electricity storage devices 300 is placed for a corresponding one of the consumers, and includes a storage battery (a secondary battery) that can charge or discharge electricity. The electricity storage device 300 discharges to feed electricity to a load 600 or another electricity storage device 300. In addition, the electricity storage device 300 receives electricity from an electricity generation device 400, the other electricity storage device 300, a line, or the like, to charge.

The electricity generation device 400 is placed for each of the consumers. The electricity generation device 400 is, for instance, a photovoltaic generation device, and feeds electricity to the electricity storage device 300, the load 600, or the like.

A distribution board 500 is placed for each consumer, and includes a circuit breaker that breaks an electrical connection between the load 600 and the electricity storage device 300 or the electricity generation device 400.

The load 600 is a device that consumes electricity such as a television and an air conditioner, and is placed for each consumer.

It is to be noted that the electricity storage control device 200 and the electricity storage device 300 are not necessarily placed for each consumer. For example, the electricity storage control device 200 and the electricity storage device 300 may be placed for respective consumer groups each consisting of consumers.

Figure 2:
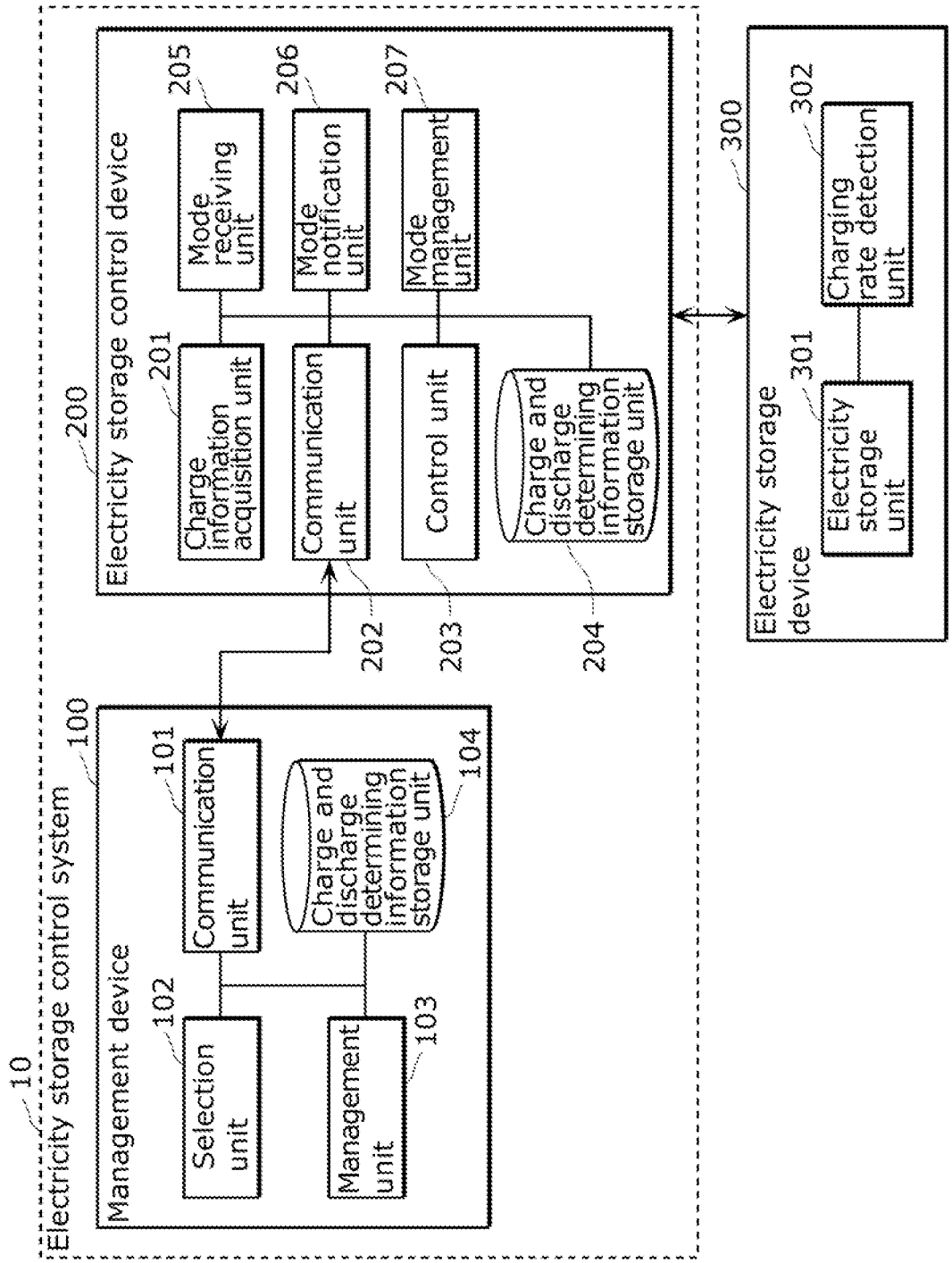
FIG. 2 is a block diagram showing a functional configuration of the electricity storage control system according to Embodiment 1 of the present invention.
Figure 3:
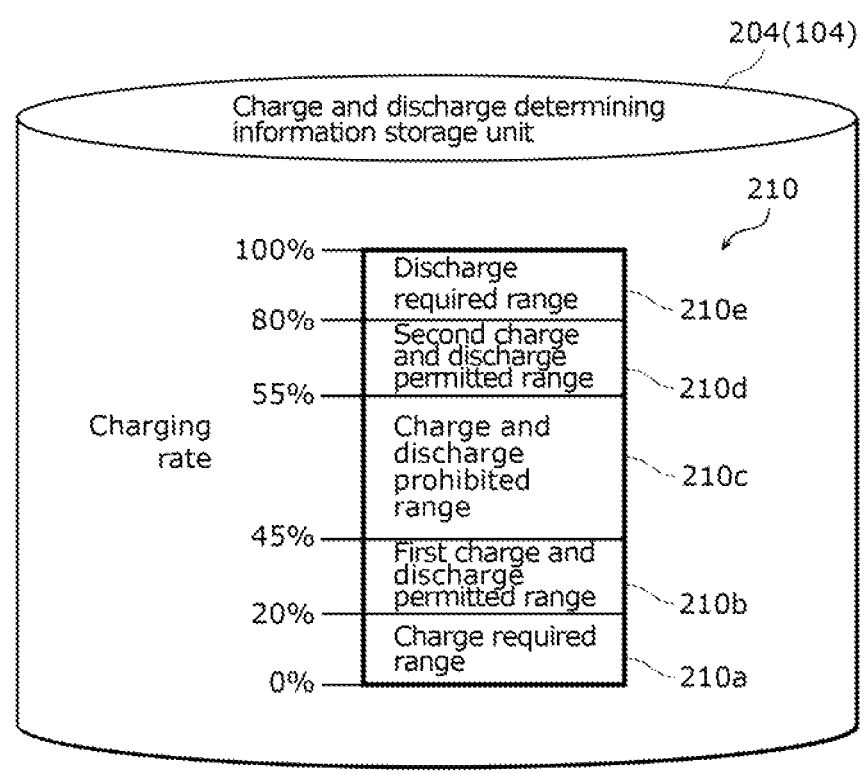
FIG. 3 is a diagram showing an example of charge and discharge determining information according to Embodiment 1 of the present invention.

The following describes a functional configuration of the electricity storage control system 10 with reference to FIGS. 2 and 3.

FIG. 2 is a block diagram showing the functional configuration of the electricity storage control system 10 according to Embodiment 1 of the present invention. As shown in FIG. 2, the electricity storage control system 10 includes: a management device 100 and an electricity storage control device 200 that are connected to each other via a network or the like; and an electricity storage device 300.

First, the management device 100 is described below.

The management device 100 includes a communication unit 101, a selection unit 102, a management unit 103, and a charge and discharge determining information storage unit 104.

The communication unit 101 is a communication interface for communicating with the electricity storage control device 200. Specifically, the communication unit 101 receives, from each of electricity storage control devices 200, a charging rate of the electricity storage device 300 connected to the electricity storage control device 200.

The selection unit 102 selects, from among electricity storage devices 300, electricity storage devices 300 that enable charge or discharge for electric power interchange, by referring to the charge and discharge determining information 210 based on the received charging rate. Stated differently, the selection unit 102 selects the electricity storage devices 300 each having the charging rate at which the charge and discharge for electric power interchange are permitted, by referring to the charge and discharge determining information 210.

The management unit 103 generates charge and discharge instructing information for performing electric power interchange between the selected electricity storage devices 300. Specifically, the management unit 103 generates the charge and discharge instructing information so that the electricity storage devices 300 do not deteriorate. For instance, the management unit 103 generates the charge and discharge instructing information so that the electric power interchange from an electricity storage device having a high charging rate to an electricity storage device having a low charging rate is performed. The management unit 103 then transmits the generated charge and discharge instructing information to the electricity storage control device 200 via the communication unit 101.

The charge and discharge determining information storage unit 104 stores the charge and discharge determining information 210. For example, the charge and discharge determining information storage unit 104 stores the charge and discharge determining information 210 in association with each of the electricity storage control devices 200. Moreover, for instance, the charge and discharge determining information storage unit 104 may store the charge and discharge determining information 210 common to the electricity storage control devices 200. It is to be noted that the charge and discharge determining information 210 is described in detail later with reference to FIG. 3.

Next, the electricity storage control device 200 is described below.

The electricity storage control device 200 includes a charge information acquisition unit 201, a communication unit 202, a control unit 203, a charge and discharge determining information storage unit 204, a mode receiving unit 205, a mode notification unit 206, and a mode management unit 207.

The charge information acquisition unit 201 acquires an electricity storage rate of one of the electricity storage devices 300 as a first charging rate. Specifically, the charge information acquisition unit 201 acquires the first charging rate from the electricity storage device 300, for example, on a regular basis.

The communication unit 202 is a communication interface for communicating with the electricity storage control device 100. Specifically, the communication unit 202 transmits either the first charging rate or a second charging rate to the management device 100.

The control unit 203 causes the communication unit 202 to transmit the second charging rate instead of the first charging rate when (a) the electricity storage control device is operating in a mode that prohibits at least one of charge and discharge for electric power interchange and (b) the first charging rate is defined as a charging rate at which charge and discharge are permitted in the charge and discharge determining information 210.

It is to be noted that the first charging rate is a charging rate that the charge information acquisition unit 201 acquires from the electricity storage device 300. The second charging rate is a charging rate that is defined as a charging rate at which charge and discharge are prohibited in the charge and discharge determining information 210. In other words, the second charging rate is a charging rate inducted in a charge and discharge prohibited range that is described later.

Moreover, when receiving the charge and discharge instructing information from the management device 100, the control unit 203 controls the electricity storage device 300 so that the electricity storage device 300 charges or discharges according to the charge and discharge instructing information. This achieves the electric power interchange between the electricity storage devices.

The charge and discharge determining information storage unit 204 stores the charge and discharge determining information 210. To put it another way, the charge and discharge determining information storage unit 204 stores the charge and discharge determining information 210 in common with the charge and discharge determining information stored in the charge and discharge determining information storage unit 104 of the management device 100. For instance, when the charge and discharge determining information storage unit 104 of the management device 100 stores the charge and discharge determining information 210 in association with each of the electricity storage control devices 200, the charge and discharge determining information storage unit 204 of the electricity storage control device 200 stores, among the pieces of the charge and discharge determining information 210, charge and discharge determining information 210 that is the same as the charge and discharge determining information 210 corresponding to the electricity storage control device 200. It is to be noted that the charge and discharge determining information 210 is described in detail later with reference to FIG. 3.

The mode receiving unit 205 receives, from a user, an operation mode switching instruction for the electricity storage control device 200. In this embodiment, an operation mode includes a normal mode and a privacy mode. In other words, the mode receiving unit 205 receives an instruction to switch to the normal mode or the privacy mode.

Here, the normal mode is a mode that permits charge for electric power interchange. In contrast, the privacy mode is a mode that prohibits discharge for electric power interchange. Thus, the user may determine the operation mode in consideration of an electricity consumption plan. For example, when expecting that an amount of electricity consumption would become smaller due to travelling or the like, the user may switch the normal mode to the privacy mode via the mode receiving unit 205.

The mode notification unit 206 notifies the user of a current operation mode. Specifically, the mode notification unit 206 notifies the user of whether the electricity storage control device 200 is operating in the normal mode or the privacy mode. For instance, the mode notification unit 206 turns on a LED lamp corresponding to the current operation mode. Moreover, for example, the mode notification unit 206 may display information indicating the current operation mode on a display unit (not shown).

The mode management unit 207 manages the current operation mode. Specifically, the mode management unit 207 sets the current operation mode according to the instruction that the mode receiving unit 205 has received from the user. Moreover, the mode management unit 207 notifies the control unit 203, the mode notification unit 206, and the like of the set current operation mode.

Next, the electricity storage device 300 that is connected to such an electricity storage control device 200 is described below.

The electricity storage device 300 includes an electricity storage unit 301 and a charging rate detection unit 302.

The electricity storage unit 301 is, for instance, a storage battery (a secondary battery) such as a lithium-ion battery and a sodium-sulfur battery.

The charging rate detection unit 302 detects a charging rate of the electricity storage unit 301. Specifically, the charging rate detection unit 302 detects the charging rate of the electricity storage unit 301 based on, for example, a previously stored charge characteristics curve. The charging rate shows a current amount of charge relative to the maximum charging capacity of the electricity storage unit 301. Specifically, the charging rate is calculated by the following equation.

charging rate=current amount of charge/maximum charging capacity×100(%)

Next, the charge and discharge determining information 210 that is stored in the charge and discharge determining information storage unit 104 and the charge and discharge determining information storage unit 204 is described below with reference to FIG. 3.

FIG. 3 is a diagram showing an example of the charge and discharge determining information 210 according to Embodiment 1 of the present invention.

The charging rate at which the charge and discharge for electric power interchange are permitted and the charging rate at which the same is prohibited are defined in the charge and discharge determining information 210. In other words, the charge and discharge determining information 210 defines whether or not the electricity storage device 300 is capable of performing the charge or discharge for electric power interchange, by using the charging rates.

In this embodiment, as shown in FIG. 3, charging rate ranges (a charge required range 210a, a first charge and discharge permitted range 210b, a charge and discharge prohibited range 210c, a second charge and discharge permitted range 210d, and a discharge required range 210e) are defined in the charge and discharge determining information 210.

The charge required range 210a indicates a charging rate range in which charge is required to reduce deterioration of the electricity storage device 300. In other words, when receiving a charging rate included in the charge required range 210a, the management device 100 generates charge and discharge instructing information for causing the electricity storage device 300 to charge at the charging rate. It is to be noted that the charge required range 210a is defined as indicating a range of more than 0% and less than 20% in FIG. 3.

The first charge and discharge permitted range 210b indicates a charging rate range in which charge and discharge of the electricity storage device 300 are permitted. Stated differently, when receiving a charging rate included in the charge required range 210a, the management device 100 generates charge and discharge instructing information for causing the electricity storage device 300 to charge or discharge at the charging rate. It is to be noted that the first charge and discharge permitted range 210b is defined as indicating a range of more than 20% and less than 45% (a first threshold value) in FIG. 3.

The charge and discharge prohibited range 210c is between the first charge and discharge permitted range 210b and the second charge and discharge permitted range 210d. To put it another way, when receiving a charging rate included in the charge and discharge prohibited range 210c, the management device 100 cannot generate charge and discharge instructing information for causing the electricity storage device 300 to charge or discharge at the charging rate. It is to be noted that the charge and discharge prohibited range 210c is defined as indicating a range of more than 45% (the first threshold value) and less than 55% (a second threshold value).

As with the first charge and discharge permitted range 210b, the second charge and discharge permitted range 210d indicates a charging rate range in which the charge or discharge of the electricity storage device 300 is permitted. It is to be noted that the second charge and discharge permitted range 210c is defined as indicating a range of more than 55% (the second threshold value) and less than 80% in FIG. 3.

The discharge required range 210e indicates a charging rate range in which discharge is required to reduce the deterioration of the electricity storage device 300. In other words, when receiving a charging rate included in the discharge required range 210e, the management device 100 generates charge and discharge instructing information for causing the electricity storage device 300 to discharge at the charging rate. The discharge required range 210e is defined as indicating a range of more than 80% and less than 100% in FIG. 3.

It is to be noted that the charge and discharge determining information 210 shown in FIG. 3 is an example, and is not necessarily the information described above. For instance, the charge required range 210a or the discharge required range 210e is not necessarily defined. Moreover, for example, only one of the first charge and discharge permitted range 210b and the second charge and discharge permitted range 210d may be defined.

The following describes each of various operations performed by the electricity storage control device 200 thus configured.

Figure 4:
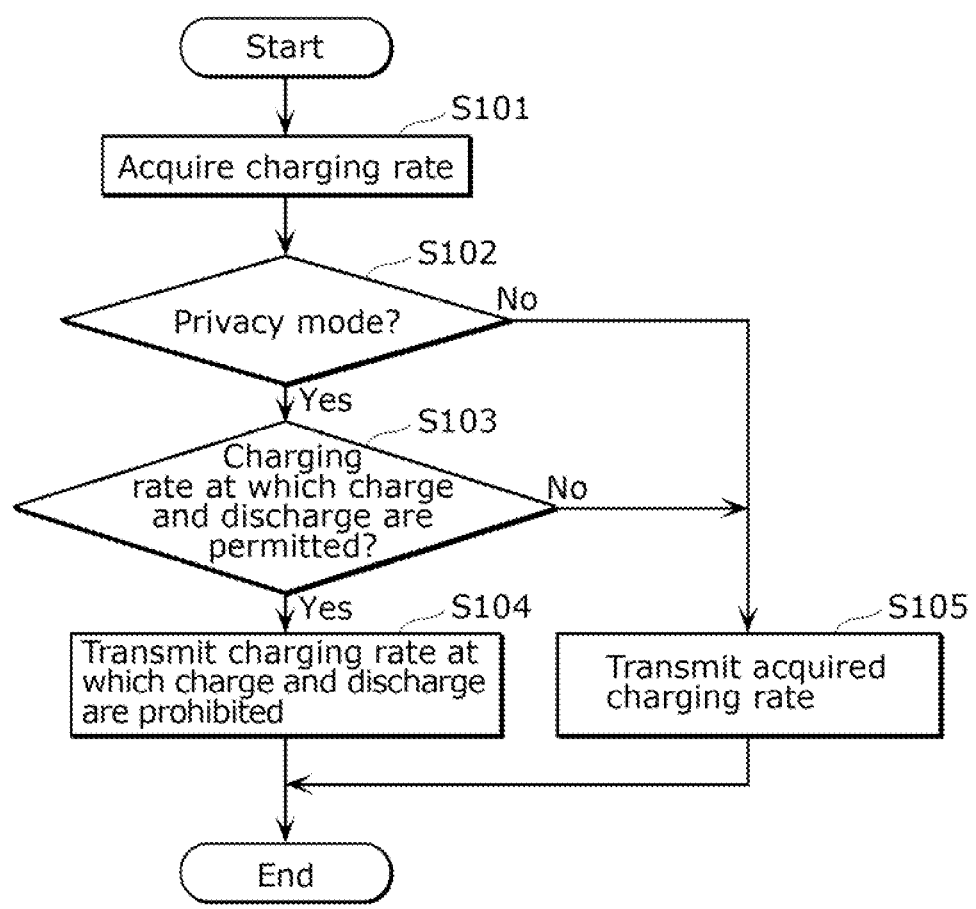
FIG. 4 is a flow chart showing an operation of an electricity storage control device according to Embodiment 1 of the present invention.

FIG. 4 is a flow chart showing a flow of charging rate transmission processing performed by the electricity storage control device 200 according to Embodiment 1 of the present invention.

First, the charge information acquisition unit 201 acquires a charging rate of one of the electricity storage devices 300 as a first charging rate (S101). Subsequently, the control unit 203 determines whether a current mode is a privacy mode or not (S102).

Here, when it is determined that the current mode is the privacy mode (Yes in S102), the control unit 203 determines whether or not the acquired first charging rate is a charging rate at which charge and discharge are permitted and which is less than a predetermined threshold value (S103). Specifically, for instance, the control unit 203 determines, by referring to the charge and discharge determining information 210 shown in FIG. 3, whether or not the acquired charging rate is less than the predetermined threshold value (55%) and is included in the first charge and discharge permitted range 210b.

Here, when it is determined that the acquired charging rate is the charging rate at which the charge and discharge are permitted and which is less than the predetermined threshold value (Yes in S103), the control unit 203 causes the communication unit 202 to transmit a second charging rate instead of the first charging rate (S104). Stated differently, the communication unit 202 transmits, to the management device 100, not the first charging rate acquired in step S101 but the second charging rate (e.g., 45%) defined as the charging rate at which the charge and discharge are prohibited.

In contrast, when it is determined that the current mode is not the privacy mode (No in S102) or that the acquired first charging rate is not the charging rate at which the charge and discharge are permitted or which is less than the predetermined threshold value (No in S103), the control unit 203 causes the communication unit 202 to transmit the first charging rate (S105). To put it another way, the communication unit 202 directly transmits the first charging rate acquired in step S101 to the management device 100.

It is to be noted that such charging rate transmission processing is performed periodically, for example. In other words, the communication unit 202 periodically transmits, either the first charging rate or the second charging rate to the management device 100. Moreover, when the management device 100 requests the transmission of the charging rate, the charging rate transmission processing may be performed.

Figure 5:
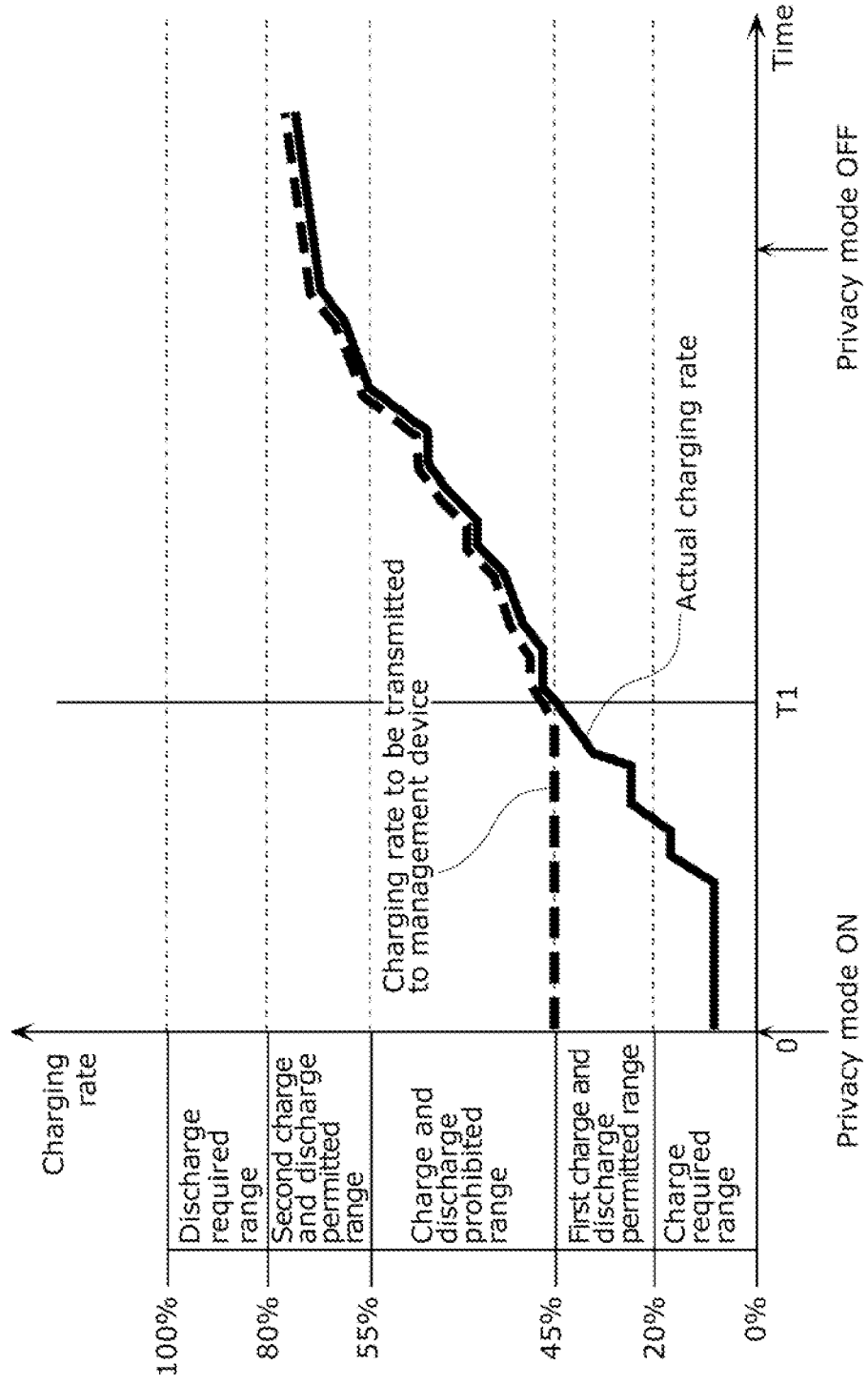
FIG. 5 is a graph showing an example of a temporal variation of an actual charging rate acquired by the electricity storage control device according to Embodiment 1 of the present invention, and an example of a temporal variation of a charging rate to be transmitted to a management device.

FIG. 5 is a graph showing an example of a temporal variation of an actual charging rate acquired by the electricity storage control device according to Embodiment 1 of the present invention, and an example of a temporal variation of a charging rate to be transmitted to a management device. In FIG. 5, the horizontal axis indicates a time, and the vertical axis indicates a charging rate.

As shown in FIG. 5, during a period of time (time 0 to T1) when the actual charging rate (the first charging rate) is included in the first charge and discharge permitted range or the charge required range, instead of the actual charging rate, the second charging rate included in the charge and discharge prohibited range is transmitted to the management device 100. It is to be noted that although the control unit 203 causes the communication unit 202 to transmit, as the second charging rate, 45% that is the charging rate within the charge and discharge prohibited range, it is not always necessary to transmit a certain charging rate. For instance, the control unit 203 may randomly select a charging rate (from 45% to 55%) in the charge and discharge prohibited range, and cause the communication unit 202 to transmit the selected charging rate as the second charging rate.

Moreover, as shown in FIG. 5, when the actual charging rate is higher than or equal to 55% though the current mode is the privacy mode, the control unit 203 causes the communication unit 202 to directly transmit the actual charging rate. As a result, for example, it is possible to sell electricity to other consumers without wasting electricity generated by the electricity generation device 400 during one's absence.

The following describes each of various operations performed by the management device 100.

Figure 6:
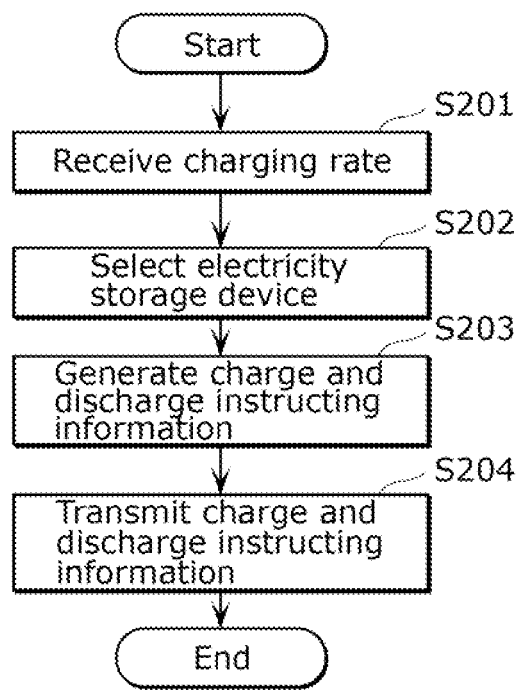
FIG. 6 is a flow chart showing an operation of a management device according to Embodiment 1 of the present invention.

FIG. 6 is a flow chart showing an operation of the management device according to Embodiment 1 of the present invention.

First, the communication unit 101 receives a charging rate of the electricity storage device 300 from each of the electricity storage control devices 200 (S201). Next, the selection unit 102 selects, from among the electricity storage devices 300, electricity storage devices 300 each having a charging rate at which charge and discharge for electric power interchange are permitted, by referring to the charge and discharge determining information 210 stored in the charge and discharge determining information storage unit 104 (S202). Stated differently, the selection unit 102 selects the electricity storage devices 300 for which a charging rate included in a range other than the charge and discharge prohibited range 210c is detected in the charge and discharge determining information 210.

Then, the management unit 103 generates instruction information for causing electric power interchange between the selected electricity storage devices 300 (S203). Specifically, the management unit 103 generates charge and discharge instructing information for causing the electric power interchange from the electricity storage devices 300 having a high charging rate to the electricity storage devices 300 having a low charging rate.

For example, the management unit 103 generates charge and discharge instructing information for causing the electric power interchange from the electricity storage devices 300 having a charging rate included in the discharge required range to the electricity storage devices 300 having a charging rate included in the charge required range. Here, when the number of the electricity storage devices 300 having the charging rate included in the discharge required range is less than the number of the electricity storage devices 300 having the charging rate included in the charge required range, the management unit 103 further generates charge and discharge instructing information for causing electric power interchange from the electricity storage devices 300 having a charging rate included in the second charge and discharge permitted range to the electricity storage devices 300 having a charging rate included in the charge required range. Conversely, when the number of the electricity storage devices 300 having the charging rate included in the charge required range is less than the number of the electricity storage devices 300 having the charging rate included in the discharge required range, the management unit 103 further generates charge and discharge instructing information for causing electric power interchange from the electricity storage devices 300 having a charging rate included in the discharge required range to the electricity storage devices 300 having a charging rate included in the first charge and discharge permitted range.

Finally, the management unit 103 transmits the charge and discharge instructing information to the electricity storage control device 200 connected to the electricity storage device 300 that is caused to charge or discharge (S204).

As stated above, the electricity storage control system 10 according to this embodiment makes it possible to transmit, to the management device 100, the second charging rate defined as the charging rate at which the charge and discharge are prohibited instead of the First charging rate acquired from the electricity storage device 300, when operating in the operation mode that prohibits the charge for electric power interchange. In other words, when it is necessary to prohibit the charge for the electric power interchange, it is possible to prevent the management device 100 from causing the charge for the electric power interchange. In short, it is possible to reflect the electricity consumption plan of each consumer in the charge and discharge instruction for electric power interchange. Consequently, it is possible to reduce occurrence of unnecessary electric power interchange.

Moreover, the electricity storage control system 10 eliminates the need for sharing the prohibition of the charge for the electric power interchange with the management device 100. Stated differently, it is possible to prevent the charge and discharge for the electric power interchange using the charging rate to be transmitted to the management device 100, without notifying the management device 100 of the electricity consumption plan of the consumer or the like. Thus, it is possible to protect privacy information of the consumer such as a plan for long-term absence from home.

Furthermore, the electricity storage control system 10 makes it possible to transmit the second charging rate instead of the first charging rate when the first charging rate is less than the predetermined threshold value. To put it another way, when the first charging rate is higher than or equal to the predetermined threshold value, it is possible to directly transmit the first charging rate even when the first charging rate is the charging rate at which the charge and discharge are permitted. Consequently, it is possible to discharge for other electricity storage devices when the charging rate is high, thereby allowing the electric power interchange to be performed efficiently.

Moreover, it is possible to set the charging rate range in which the electricity storage device 300 deteriorates as the charge and discharge permitted range, by setting the range between the first and second charge and discharge permitted ranges as the charge and discharge prohibited range, thereby reducing the deterioration of the electricity storage device 300.

Embodiment 2

A management device according to Embodiment 2 of the present invention differs from the management device according to Embodiment 1 mainly in that charge and discharge determining information stored in a charge and discharge determining information storage unit is updated. The following describes an electricity storage control system according to Embodiment 2 with reference to the drawings, mainly centering around differences from Embodiment 1.

Figure 7:
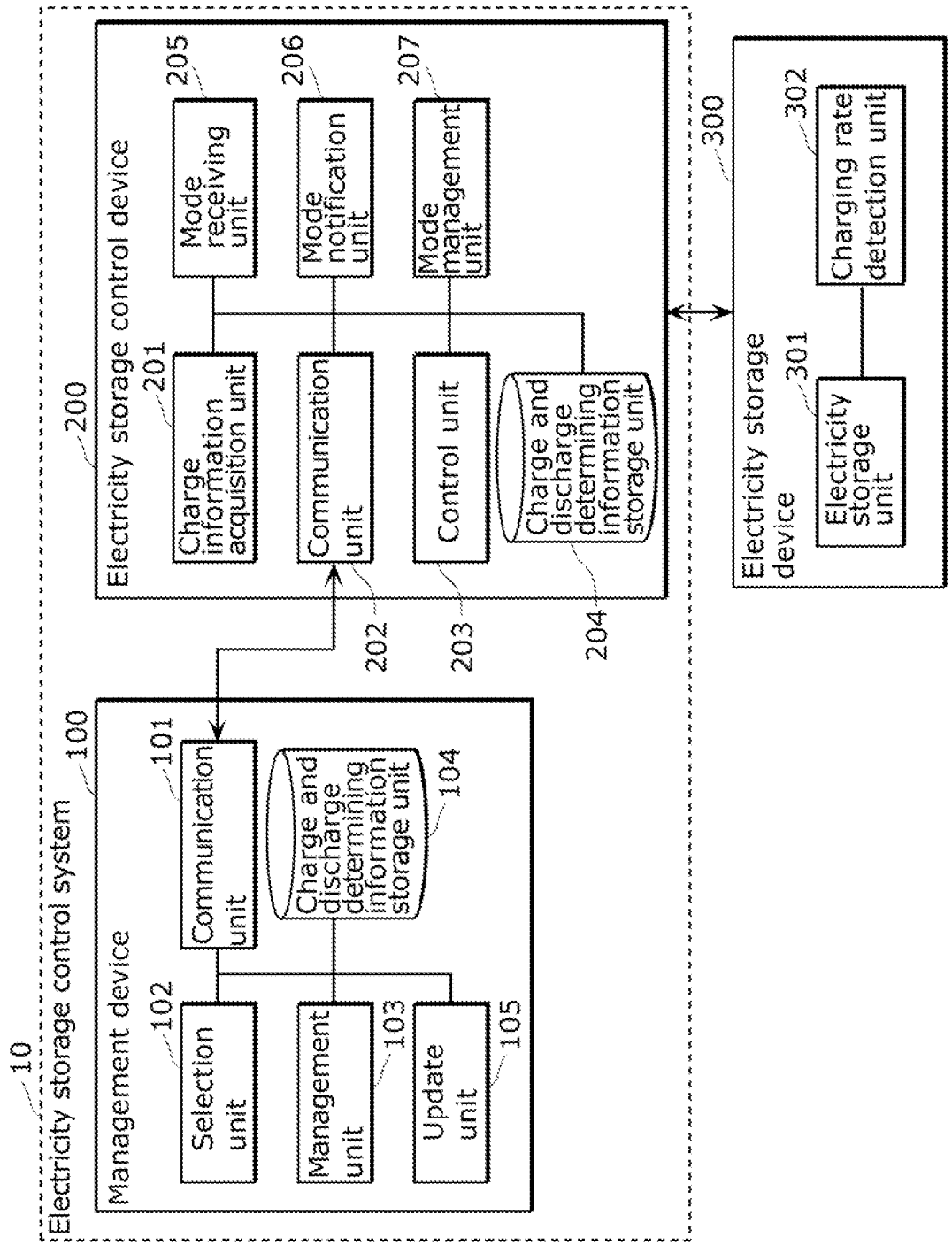
FIG. 7 is a block diagram showing a functional configuration of an electricity storage control system according to Embodiment 2 of the present invention.

FIG. 7 is a block diagram showing a functional configuration of an electricity storage control system 10 according to Embodiment 1 of the present invention. It is to be noted that hereinafter description of the same constituent elements as the constituent elements shown in FIG. 2 is omitted.

As shown in FIG. 7, a management device 100 includes an update unit 105 in addition to the constituent elements shown in FIG. 2.

The update unit 105 updates charge and discharge determining information 210 depending on the number of electricity storage devices 300, among the electricity storage devices 300, that permit charge or discharge for electric power interchange. Specifically, the update unit 105 updates the charge and discharge determining information 210 stored in the charge and discharge determining information storage unit 104 so that, for instance, a charge and discharge prohibited range 210c defined in the charge and discharge determining information 210 decreases as the number of the electricity storage devices 300 that permit the charge or discharge for the electric power interchange decreases.

Moreover, for example, the update unit 105 may adjust a first charge and discharge permitted range 210b, a charge and discharge prohibited range 210c, and a second charge and discharge permitted range 210d so that the number of the electricity storage devices 300 selected by the selection unit 102 is greater than or equal to a certain number.

Furthermore, for instance, when the number of the electricity storage devices 300 having a charging rate at which charge and discharge are permitted is less than a threshold value, the update unit 105 may update the charge and discharge determining information 210 so that a defined range of the charging rate at which the charge and discharge are permitted increases.

When the charge and discharge determining information 210 stored in the charge and discharge determining information storage unit 104 is updated as above, the communication unit 101 transmits the updated charge and discharge determining information 210 to each of the electricity storage control devices 200. It is to be noted that when receiving the updated charge and discharge determining information 210, the electricity storage control device 200 stores the received charge and discharge determining information 210 into the charge and discharge determining information storage unit 204.

Figure 8:
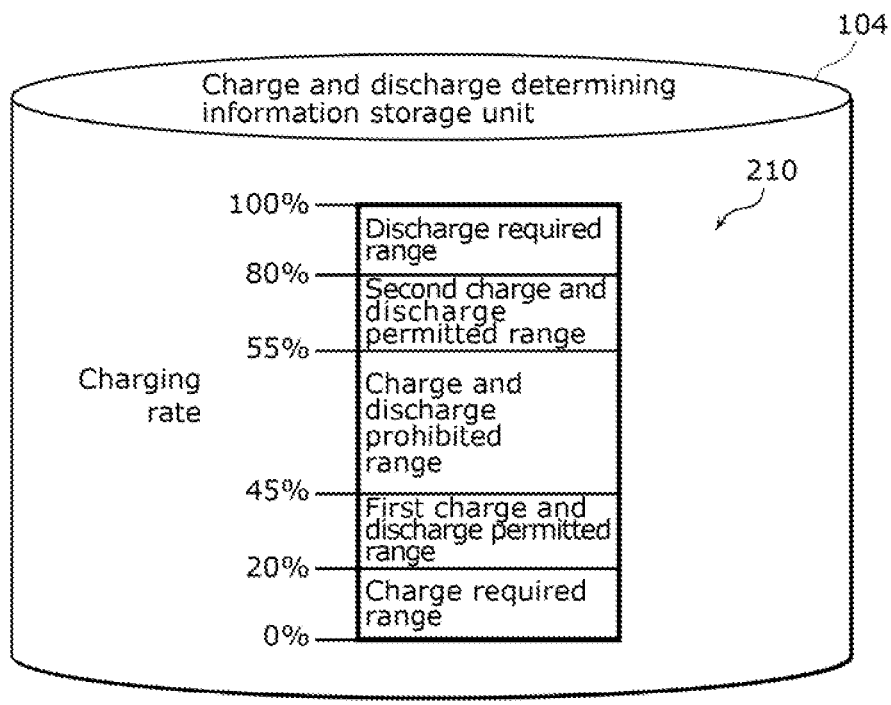
FIG. 8 is a diagram for illustrating processing performed by an update unit according to Embodiment 2 of the present invention.
Figure 8:
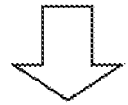
Figure 8:
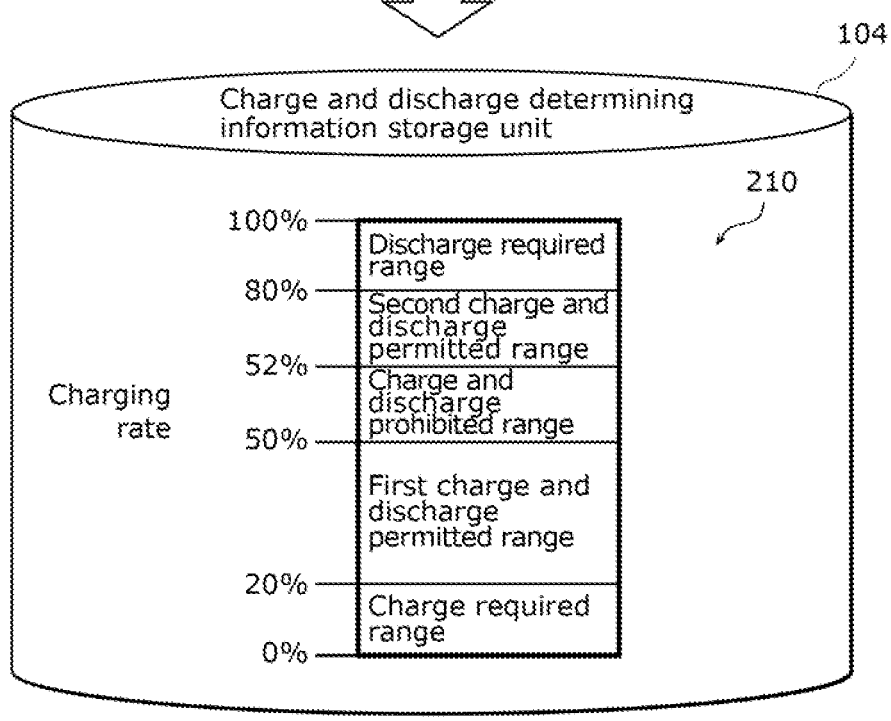

FIG. 8 is a diagram for illustrating processing performed by the update unit 105 according to Embodiment 2 of the present invention.

When the number of the selected electricity storage devices 300 is less than the certain number, the update unit 105 updates charge and discharge determining information 210 as shown in (a) in FIG. 8 with charge and discharge determining information 210 as shown in (b) in FIG. 8. In other words, the update unit 105 updates the charge and discharge determining information 210 so that the charge and discharge prohibited range decreases and the first and second charge and discharge permitted ranges increase.

As described above, the electricity storage control system 10 according to this embodiment makes it possible to reduce occurrence of inefficient electric power interchange due to the decrease in the number of the electricity storage devices 300 that can charge or discharge.

It is to be noted that the update unit 105 may update the charge and discharge determining information 210 stored in the charge and discharge determining information storage unit 104 so that, for example, the charge and discharge prohibited range 210c defined in the charge and discharge determining information 210 increases as the number of the electricity storage devices 300 that can charge or discharge for electric power interchange increases.

Embodiment 3

An electricity storage control device according to Embodiment 3 of the present invention differs from the electricity storage control device according to Embodiment 1 mainly in that a second charging rate is calculated so that a temporal variation of a charging rate to be transmitted to a management device approximates a temporal variation of a past charging rate of an electricity storage device. The following describes an electricity storage control system according to Embodiment 3 with reference to the drawings, mainly centering around differences from Embodiment 1.

Figure 9:
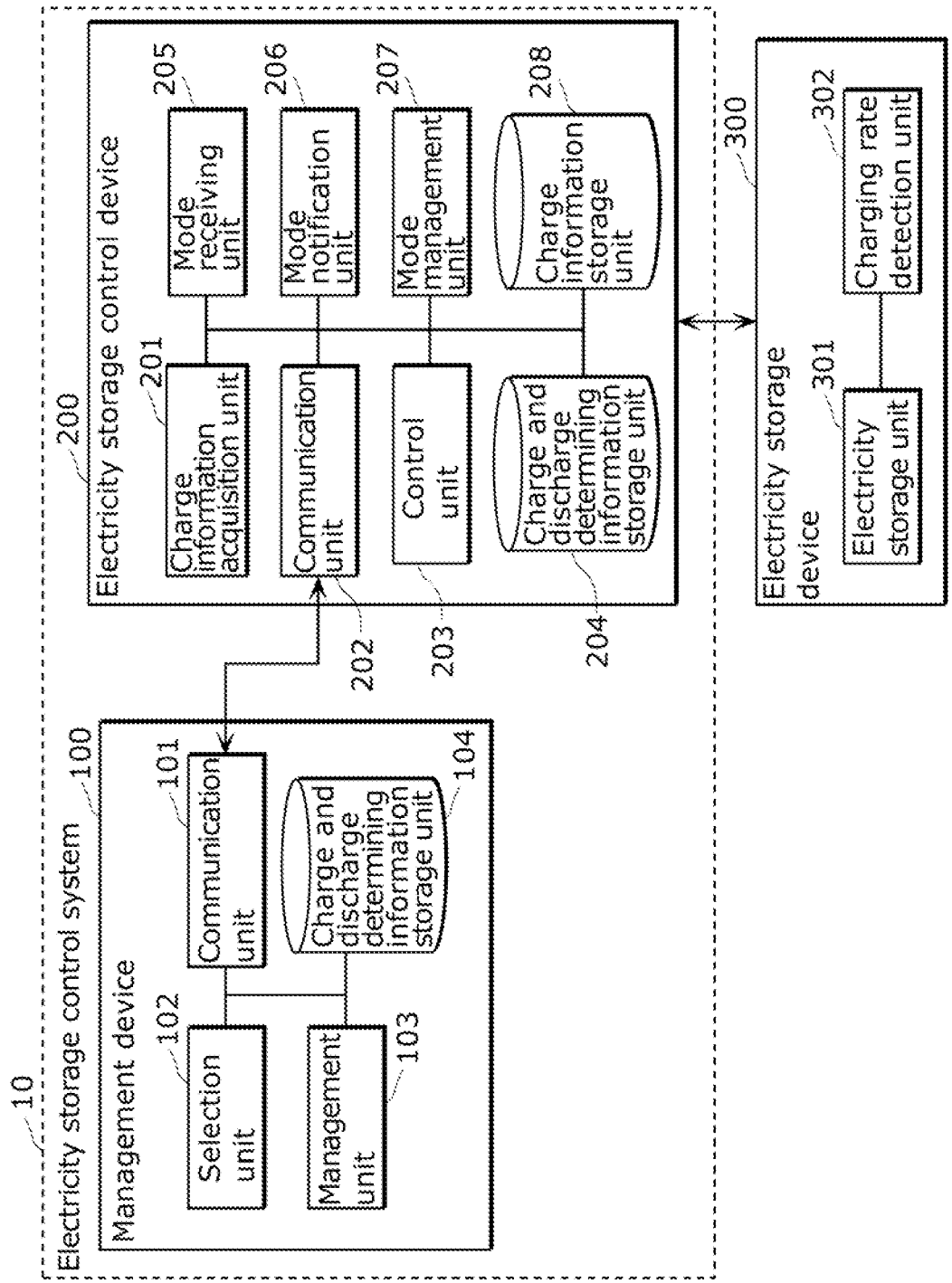
FIG. 9 is a block diagram showing a functional configuration of an electricity storage control system according to Embodiment 3 of the present invention.

FIG. 9 is a block diagram showing a functional configuration of an electricity storage control system 10 according to Embodiment 3 of the present invention. As shown in FIG. 9, the electricity storage control system 10 according to this embodiment includes a charge information storage unit 208 in addition to the constituent elements shown in FIG. 2.

The charge information storage unit 208 stores charging rates previously acquired by the charge information acquisition unit 201. Stated differently, the charge information storage unit 208 stores temporal variations of a charging rate of the electricity storage device 300 that is acquired previously and a charging rate to be transmitted to the management device 100.

When transmitting a second charging rate instead of a first charging rate to the management device 100, the control unit 203 calculates the second charging rate so that the temporal variation of the charging rate to be transmitted to the management device 100 approximates the temporal variation of the charging rate of the electricity storage device 300 that is acquired previously.

The following describes each of various operations performed by the electricity storage control device 200 thus configured.

Figure 10:
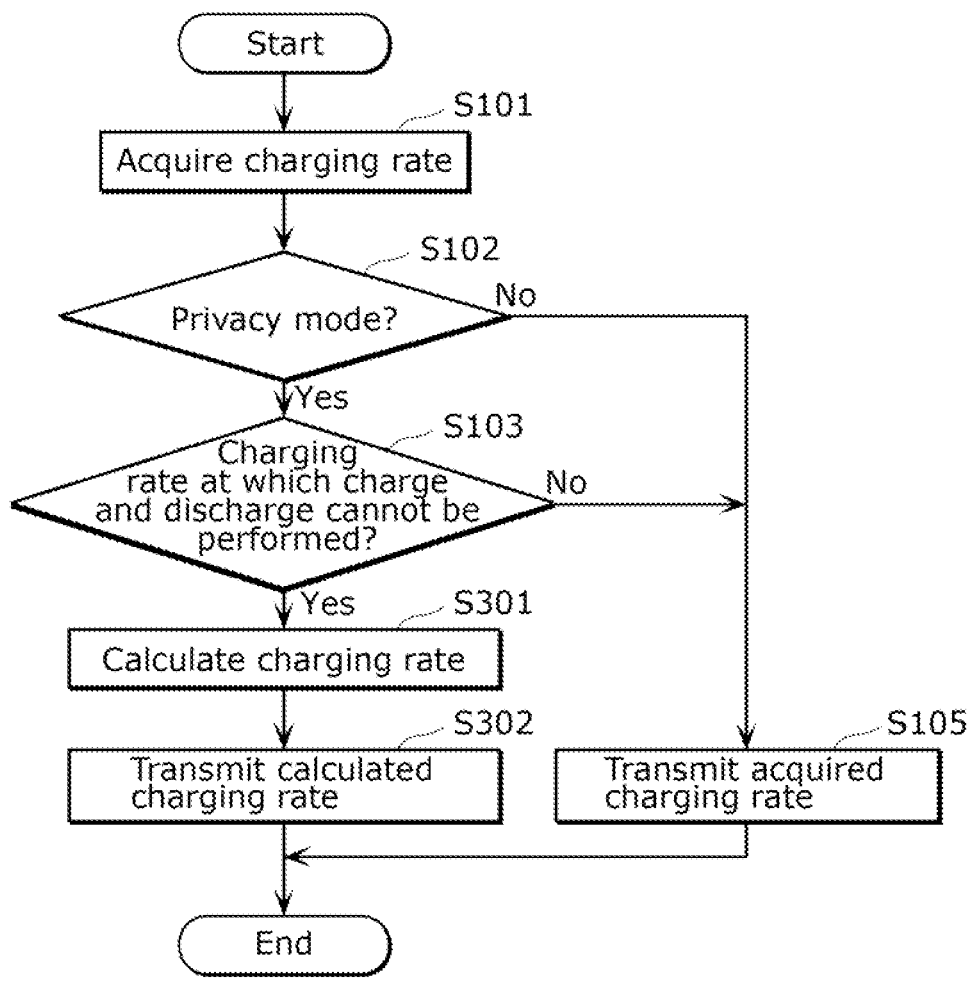
FIG. 10 is a flow chart showing a flow of charging rate transmission processing performed by an electricity storage control device 200 according to Embodiment 3 of the present invention.

FIG. 10 is a flow chart showing a flow of charging rate transmission processing performed by the electricity storage control device 200 according to Embodiment 3 of the present invention. It is to be noted that in FIG. 10 the same reference signs are assigned to the same steps as the steps shown in FIG. 4, and description thereof is omitted.

When the acquired first charging rate is the charging rate at which the charge and discharge are permitted and which is less than the predetermined threshold value (Yes in S103), the control unit 203 calculates a second charging rate so that a temporal variation of a charging rate to be transmitted to the management device 100 approximates a temporal variation of a charging rate of the electricity storage device 300 that is acquired previously (S301).

The communication unit 202 transmits the calculated second charging rate to the management device 100 (S302).

Figure 11:
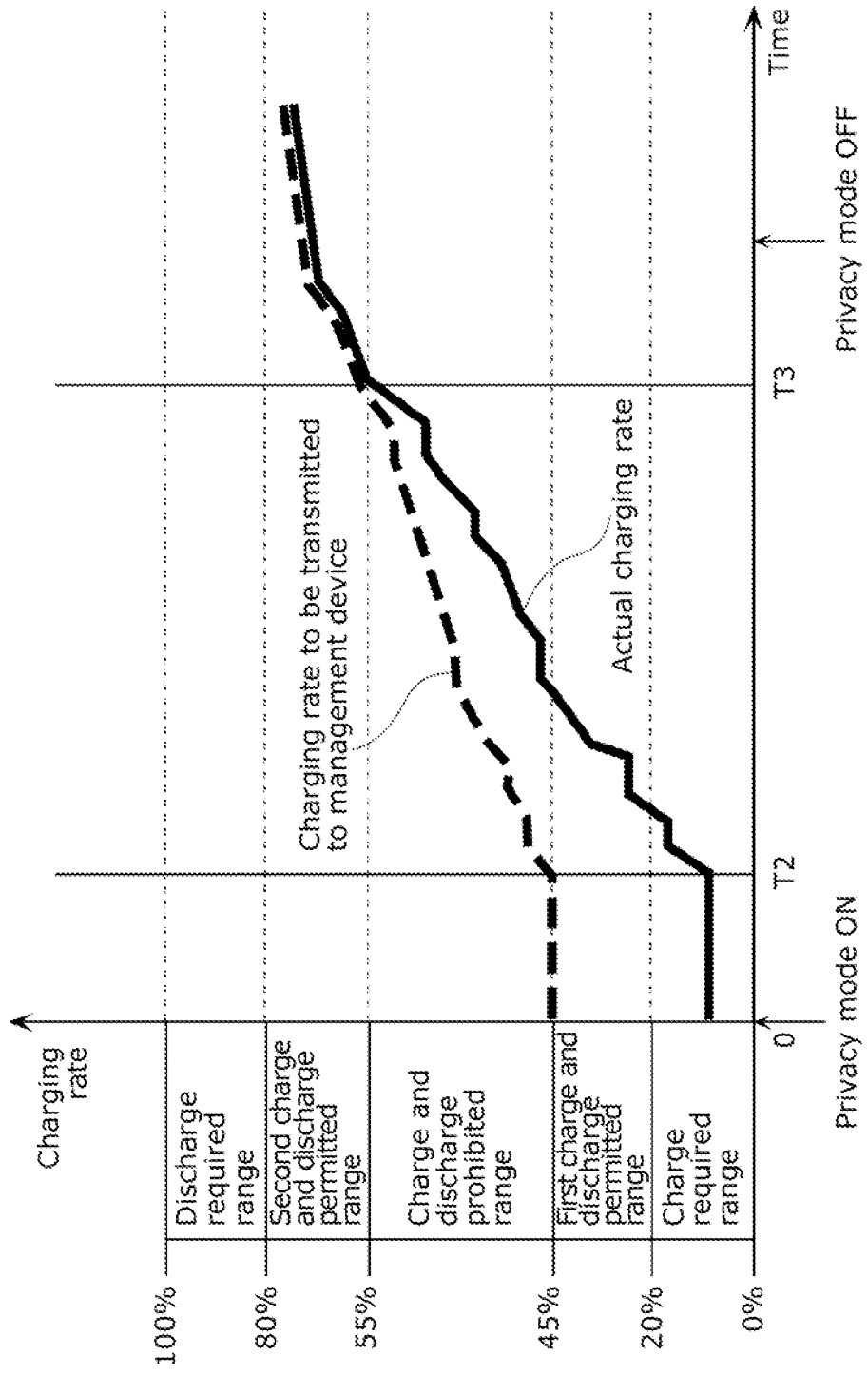
FIG. 11 is a graph showing an example of a temporal variation of an actual charging rate acquired by the electricity storage control device according to Embodiment 3 of the present invention, and an example of a temporal variation of a charging rate to be transmitted to a management device.

FIG. 11 is a graph showing an example of a temporal variation of an actual charging rate acquired by the electricity storage control device 200 according to Embodiment 3 of the present invention, and an example of a temporal variation of a charging rate to be transmitted to the management device 100.

For instance, at time T2, the control unit 203 estimates a time required for the actual charging rate (the first charging rate) to reach 55%, based on a rate of change of the actual charging rate. Then, the control unit 203 extracts, from temporal variations of past charging rates stored in the charge information storage unit 208, a temporal variation in which a current charging rate has changed from 45% to 55% for the estimated time. The control unit 203 calculates the second charging rate according to the temporal variation thus extracted. As a result, as shown in FIG. 11, the temporal variation of the charging rate to be transmitted to the management device 100 appears natural.

As described above, the electricity storage control system 10 according to this embodiment makes it possible to transmit the second charging rate that is calculated so that the temporal variation of the charging rate to be transmitted to the management device 100 approximates the temporal variation of the past charging rate, when the second charging rate is transmitted instead of the first charging rate. To put it another way, the temporal variation of the charging rate to be received by the management device 100 appears natural, and thus it is possible to reduce a possibility of an operation mode being determined based on the temporal variation of the charging rate. In short, it is possible to further protect the privacy information of the consumer.

Although the electricity storage control system 10 according to one aspect of the present invention has been described above based on the embodiments, the present invention is not limited to the embodiments. Various modifications to the embodiments and forms constructed by combining constituent elements of different embodiments are intended to be within the scope of the present invention, the various modifications and the forms not departing from the essence of the present invention and being conceived by those skilled in the art.

Although the privacy mode is the operation mode that prohibits the charge for electric power interchange in Embodiments 1 to 3, the privacy mode may be, for example, an operation mode that prohibits discharge for electric power interchange. In addition, the privacy mode may be, for instance, an operation mode that prohibits charge and discharge for electric power-interchange.

Moreover, although the charge required range 210a and the discharge required range 210e are defined in the charge and discharge determining information 210 in Embodiments 1 to 3, these ranges are not necessarily defined. In addition, only one of the first charge and discharge permitted range 210b and the second charge and discharge permitted range 210d may be defined in the charge and discharge determining information 210.

Furthermore, although the second charging rate is transmitted instead of the first charging rate when the first charging rate is less than the predetermined threshold value in Embodiments 1 to 3, the second charging rate may be transmitted when the first charging rate is greater than or equal to the predetermined threshold value.

Moreover, although the mode receiving unit 205 receives the operation mode switching instruction from the user in Embodiments 1 to 3, the mode receiving unit 205 does not necessarily receive the operation mode switching instruction from the user. For example, the mode management unit 207 may automatically switch the operation mode based on the acquired first charging rate. Specifically, the mode management unit 207 may automatically switch the operation mode to the normal mode when, for instance, a predetermined charging rate is not reached within a predetermined time since the operation mode is switched to the privacy mode. In addition, for example, the mode management unit 207 may switch the operation mode to the privacy mode with timing when a front door is locked, in conjunction with a home security system. Alternatively, the mode management unit 207 may perform ON/OFF control of the privacy mode via a network from the outside of home.

It is to be noted that in the case where the first charging rate is acquired even when the electricity storage control device starts operating in the privacy mode, the second charging rate is transmitted instead of the first charging rate in Embodiments 1 to 3. However, in the case where the second charging rate is transmitted as above, a charging rate to be transmitted to the management device intermittently varies when the electricity storage control device starts operating in the privacy mode. As a result, the temporal variation of the charging rate appears unnatural, and thus there is a possibility of leaking the privacy information of the consumer such as the plan for long-term absence from home.

Figure 12:
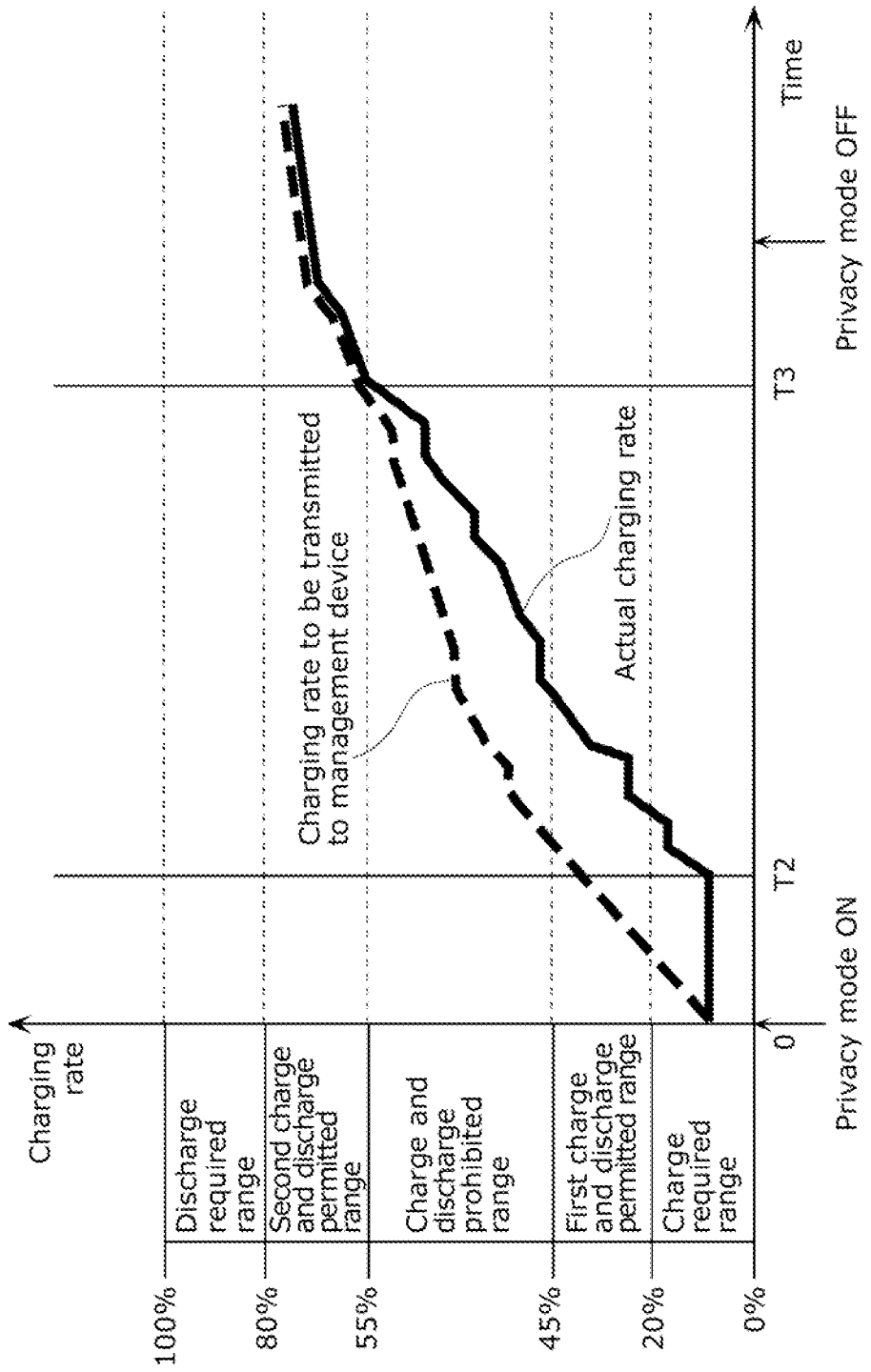
FIG. 12 is a graph showing an example of a temporal variation of an actual charging rate acquired by an electricity storage control device according to a modification of the present invention, and an example of a temporal variation of a charging rate to be transmitted to a management device.

In view of the above, as shown in FIG. 12, when the electricity storage control device starts operating in the privacy mode, the control unit 203 may cause the communication unit 202 to transmit a third charging rate instead of the first and second charging rates so that the charging rate to be transmitted to the management device 100 varies smoothly.

This prevents the charging rate to be transmitted to the management device 100 from intermittently varying when the electricity storage control device starts operating in the privacy mode, thereby reinforcing the protection of the privacy information of the consumer.

It is to be noted that the temporal variation of the charging rate shown in FIG. 12 is an example, and it is not always necessary to transmit the charging rate shown in FIG. 12. For instance, when the electricity storage control device starts operating in the privacy mode, the control unit 203 may cause the communication unit 202 to transmit a charging rate randomly selected from among charging rates within a predetermined range. This prevents the charging rate from varying monotonously. Thus, it is possible to further reduce a possibility that the temporal variation of the charging rate to be transmitted to the management device 100 appears unnatural.

It is to be noted that although the electricity variation when the charging rate is increasing is described in FIG. 12, the communication unit 202 may be caused to also transmit the third charging rate so that the charging rate to be transmitted to the management device 100 varies smoothly, when the charging rate is decreasing. In addition, although the case where the privacy mode is turned ON is described in FIG. 12, the control unit 203 may cause, for instance, the communication unit 202 to also transmit the charging rate so that the charging rate to be transmitted to the management device 100 varies smoothly, when the privacy mode is turned OFF.

Moreover, the management device 100 and the electricity storage control device 200 included in the electricity storage control system 10 do not necessarily include all the constituent elements shown in FIG. 2. The electricity storage control system 10 may have, for example, a configuration as shown in FIG. 13.

Figure 13:
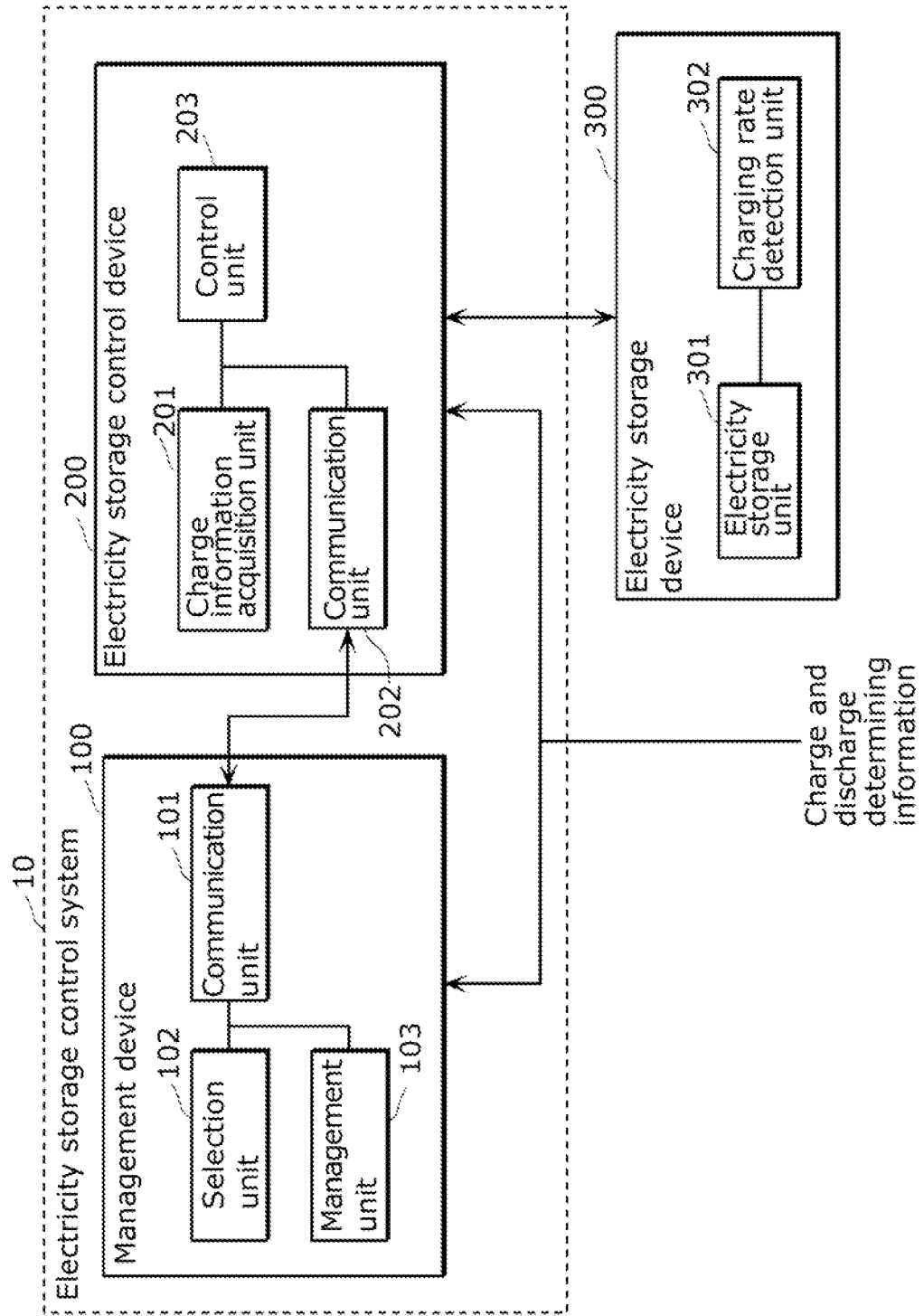
FIG. 13 is a block diagram showing a functional configuration of an electricity storage control system according to an aspect of the present invention.

In FIG. 13, the management device 100 includes the communication unit 101, the selection unit 102, and the management unit 103. The electricity storage control device 200 includes the charge information acquisition unit 201, the communication unit 202, and the control unit 203. Even when the management device 100 and the electricity storage control device 200 have such configurations, the electricity storage control device 200 makes it possible to reflect an electricity consumption plan of each consumer in a charge and discharge instruction for electric power interchange without sharing the prohibition of the charge and discharge for electric power interchange with the management device 100. Consequently, it is possible to reduce the occurrence of the unnecessary electric power interchange.

Moreover, part or all of the constituent elements included in the management device 100 or the electricity storage control device 200 in Embodiments 1 to 3 may be configured from a single system Large Scale Integration (LSI). For instance, the electricity storage control device 200 may be configured from a system LSI including the charge information acquisition unit 201, the communication unit 202, and the control unit 203.

The system LSI is a super multi-function LSI that is manufactured by integrating multiple constituent elements in one chip, and is specifically a computer system which is configured by including a microprocessor, a Read Only Memory (ROM), a Random Access Memory (RAM), and so on. A computer program is stored in the RAM. The microprocessor accomplishes its functions through the operation of the microprocessor in accordance with the computer program.

Although a system LSI is mentioned here, the integrated circuit can also be called an IC, an LSI, a super LSI, and an ultra LSI, depending on differences in the degree of integration. Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

It is to be noted that the present invention can be implemented not only as an electricity storage control device or a management device including the characteristic processing units as described herein but also as an electricity storage control method or a management method including, as steps, the characteristic processing units included in the electricity storage control device or the management device. Moreover, the present invention can be implemented as a computer program for causing a computer to execute the respective characteristic steps included in the electricity storage control method or the management method. In addition, it goes without saying that such a computer program can be distributed via a non-transitory computer-readable recording medium such as a CD-ROM or via a communication network such as the Internet.

INDUSTRIAL APPLICABILITY

The present invention is useful as an electricity storage control device, a management device, or an electricity storage control system for efficiently performing electric power interchange between electricity storage devices.

REFERENCE SIGNS LIST

10 Electricity storage control system
100 Management device
101, 202 Communication unit
102 Selection unit
103 Management unit
104, 204 Charge and discharge determining information storage unit
105 Update unit
200 Electricity storage control device
201 Charge information acquisition unit
203 Control unit
205 Mode receiving unit
208 Mode notification unit
207 Mode management unit
210 Charge and discharge determining information
300 Electricity storage device
301 Electricity storage unit
302 Charging rate detection unit
400 Electricity generation device
500 Distribution board
600 Load

The invention claimed is:

1. An electricity storage control device that transmits a charging rate of at least one of electricity storage devices to a management device that manages electric power interchange between the electricity storage devices, wherein the management device refers to charge and discharge determining information defining a charging rate at which charge and discharge for electric power interchange are permitted and a charging rate at which the charge and discharge are prohibited, and allows electric power interchange between electricity storage devices having the charging rate at which the charge and discharge are permitted, the electricity storage control device comprising:

a charge information acquisition unit configured to acquire the charging rate of the at least one electricity storage device as a first charging rate;

a communication unit configured to transmit the first charging rate to the management device; and a control unit configured to cause the communication unit to transmit, instead of the first charging rate, a second charging rate that the charge and discharge determining information defines as the charging rate at which the charge and discharge are prohibited, when (a) the electricity storage control device is operating in an operation mode that prohibits at least one of the charge for electric power interchange and the discharge for electric power interchange and (b) the charge and discharge determining information defines the first charging rate as the charging rate at which the charge and discharge are permitted.

2. The electricity storage control device according to claim 1, wherein the control unit is configured to cause the communication unit to transmit the second charging rate instead of the first charging rate when (a) the electricity storage control device is operating in an operation mode that prohibits the charge for electric power interchange, (b) the charge and discharge determining information defines the first charging rate as the charging rate at which the charge and discharge are permitted, and (c) the first charging rate is less than a predetermined threshold value.

3. The electricity storage control device according to claim 1, wherein the charge and discharge determining information defines a first charge and discharge permitted range, a charge and discharge prohibited range, and a second charge and discharge permitted range, the first charge and discharge permitted range is a range of the charging rate at which the charge and discharge for electric power interchange are permitted, and is a range less than a first threshold value, the charge and discharge prohibited range is a range of the charging rate at which the charge and discharge for electric power interchange are prohibited, and is a range greater than or equal to the first threshold value and less than a second threshold value, and the second charge and discharge permitted range is a range of the charging rate at which the charge and discharge for electric power interchange are permitted, and is a range greater than or equal to the second threshold value.

4. The electricity storage control device according to claim 1, wherein the control unit is further configured to calculate the second charging rate so that a temporal variation of a charging rate to be transmitted to the management device approximates a temporal variation of a charging rate of the at least one electricity storage device that is already acquired.

5. The electricity storage control device according to claim 1, further comprising a mode notification unit configured to notify a user that the electricity storage control device is operating in the operation mode.

6. The electricity storage control device according to claim 1, wherein the control unit is further configured to cause the communication unit to transmit a third charging rate instead of the first and second charging rates so that a charging rate to be transmitted to the management device varies smoothly when the electricity storage control device starts operating in the operation mode.

7. The electricity storage control device according to claim 1, wherein the electricity storage control device is configured as an integrated circuit.

8. An electricity storage control system comprising:

the electricity storage control device according to claim 1; and a management device that manages electric power interchange between electricity storage devices, wherein the management device includes:

a communication unit configured to receive a charging rate of each of the electricity storage devices;

a selection unit configured to select, by referring to charge and discharge determining information defining a charging rate at which charge and discharge for electric power interchange are permitted and a charging rate at which the charge and discharge are prohibited, electricity storage devices having the charging rate at which the charge and discharge are permitted, from among the electricity storage devices; and a management unit configured to cause the communication unit to transmit charge and discharge instructing information for causing, between the selected electricity storage devices, electric power interchange from an electricity storage device having a first charging rate to an electricity storage device having a second charging rate lower than the first charging rate.

9. A management device that manages electric power interchange between electricity storage devices, the management device comprising:

a communication unit configured to receive a charging rate of each of the electricity storage devices;

a selection unit configured to select electricity storage devices having a charging rate at which the harge and discharge for electric power interchange are permitted, from among the electricity storage devices, by referring to charge and discharge determining information defining the charging rate at which the charge and discharge are permitted and a charging rate at which the charge and discharge are prohibited;

a management unit configured to cause the communication unit to transmit charge and discharge instructing information for causing, between the selected electricity storage devices, electric power interchange from an electricity storage device having a first charging rate to an electricity storage device having a second charging rate lower than the first charging rate; and an update unit configured to update the charge and discharge determining information depending on the number of the electricity storage devices having the charging rate at which the charge and discharge are permitted, wherein the charge and discharge determining information defines a first charge and discharge permitted range, a charge and discharge prohibited range, and a second charge and discharge permitted range, the first charge and discharge permitted range is a range of the charging rate at which the charge and discharge for electric power interchange are permitted, and is a range less than a first threshold value, the charge and discharge prohibited range is a range of the charging rate at which the charge and discharge for electric power interchange are prohibited, and is a range greater than or equal to the first threshold value and less than a second threshold value, the second charge and discharge permitted range is a range of the charging rate at which the charge and discharge for electric power interchange are permitted, and is a range greater than or equal to the second threshold value, and the communication unit is configured to transmit the updated charge and discharge determining information to an electricity storage control device.

10. The management device according to claim 9,
wherein the update unit is configured to update the charge and discharge determining information so that a defined range of the charging rate at which the charge and discharge are permitted increases, when the number of the electricity storage devices having the charging rate at which the charge and discharge are permitted is less than a threshold value.

11. An electricity storage control method for transmitting a charging rate of at least one of electricity storage devices to a management device that manages electric power interchange between the electricity storage devices,
wherein the management device refers to charge and discharge determining information defining a charging rate at which charge and discharge for electric power interchange are permitted and a charging rate at which the charge and discharge are prohibited, and allows electric power interchange between electricity storage devices having the charging rate at which the charge and discharge are permitted,
the electricity storage control method comprising:
acquiring the charging rate of the at least one electricity storage device as a first charging rate; and
transmitting the first charging rate to the management device,
wherein, in the transmitting, instead of the first charging rate, a second charging rate that the charge and discharge determining information defines as the charging rate at which the charge and discharge are prohibited is transmitted to the management device, when (a) the electricity storage control device is operating in an operation mode that prohibits at least one of the charge for electric power interchange and the discharge for electric power interchange and (b) the charge and discharge determining information defines the first charging rate as the charging rate at which the charge and discharge are permitted.

12. A non-transitory computer-readable recording medium having a program recorded thereon for causing a computer to execute the electricity storage control method according to claim 11.

13. A management method for managing electric power interchange between electricity storage devices, the management method comprising:
receiving a charging rate of each of the electricity storage devices;
selecting electricity storage devices having a charging rate at which charge and discharge for electric power interchange are permitted, from among the electricity storage devices, by referring to charge and discharge determining information defining the charging rate at which the charge and discharge are permitted and a charging rate at which the charge and discharge are prohibited;
transmitting charge and discharge instructing information for causing, between the selected electricity storage devices, electric power interchange from an electricity storage device having a first charging rate to an electricity storage device having a second charging rate lower than the first charging rate; and
updating the charge and discharge determining information depending on the number of the electricity storage devices having the charging rate at which the charge and discharge are permitted,
wherein the charge and discharge determining information defines a first charge and discharge permitted range, a charge and discharge prohibited range, and a second charge and discharge permitted range,
the first charge and discharge permitted range is a range of the charging rate at which the charge and discharge for electric power interchange are permitted, and is a range less than a first threshold value,
the charge and discharge prohibited range is a range of the charging rate at which the charge and discharge for electric power interchange are prohibited, and is a range greater than or equal to the first threshold value and less than a second threshold value,
the second charge and discharge permitted range is a range of the charging rate at which the charge and discharge for electric power interchange are permitted, and is a range greater than or equal to the second threshold value, and
the management method further comprises transmitting the updated charge and discharge determining information to an electricity storage control device.

14. A non-transitory computer-readable recording medium having a program recorded thereon for causing a computer to execute the management method according to claim 13.

* * * * *